Aug. 20, 1957   J. A. ANDERLE   2,803,065
MACHINE USEFUL IN THE MANUFACTURE OF VENETIAN BLINDS
Filed June 23, 1954   11 Sheets-Sheet 1

INVENTOR
JOSEPH A. ANDERLE
BY
HIS ATTORNEYS

Aug. 20, 1957 J. A. ANDERLE 2,803,065
MACHINE USEFUL IN THE MANUFACTURE OF VENETIAN BLINDS
Filed June 23, 1954 11 Sheets-Sheet 2

INVENTOR
JOSEPH A. ANDERLE
BY
HIS ATTORNEYS

Aug. 20, 1957   J. A. ANDERLE   2,803,065
MACHINE USEFUL IN THE MANUFACTURE OF VENETIAN BLINDS
Filed June 23, 1954   11 Sheets-Sheet 4

FIG.6

INVENTOR
JOSEPH A. ANDERLE
BY
HIS ATTORNEYS

INVENTOR
JOSEPH A. ANDERLE
BY
*Ramsey, Chisholm & Hilder*
HIS ATTORNEYS Aug. 20, 1957 J. A. ANDERLE 2,803,065
MACHINE USEFUL IN THE MANUFACTURE OF VENETIAN BLINDS
Filed June 23, 1954 11 Sheets-Sheet 8

INVENTOR
JOSEPH A. ANDERLE
BY
HIS ATTORNEYS

Aug. 20, 1957 J. A. ANDERLE 2,803,065
MACHINE USEFUL IN THE MANUFACTURE OF VENETIAN BLINDS
Filed June 23, 1954 11 Sheets-Sheet 11

INVENTOR
JOSEPH A. ANDERLE
BY
HIS ATTORNEYS

United States Patent Office 2,803,065
Patented Aug. 20, 1957

2,803,065

MACHINE USEFUL IN THE MANUFACTURE OF VENETIAN BLINDS

Joseph A. Anderle, Westerleigh, N. Y., assignor to Lorentzen Hardware Mfg. Corp., New York, N. Y., a corporation of New York Application June 23, 1954, Serial No. 438,661

10 Claims. (Cl. 33—174)

This invention relates to the manufacture of Venetian blinds and, more particularly, to an apparatus and method for measuring and cutting Venetian blind ladder tape and cord to required lengths for assembly into a blind of predetermined size and height above the floor, and to apparatus for attaching bottom bar anchors to the ladder tape.

Venetian blinds usually comprise a series of horizontal slats which are supported on two or more ladder tapes depending from a head bar extending across the top of a window opening. The blind may be raised by raising the lowermost slat or bottom bar so as to accumulate the slats on the top side thereof, lift cords for raising the blind customarily being reeved upwardly through the slats from the bottom bar and depending from the head bar adjacent an end thereof. In addition, the slats can be tilted towards blind-closed position in which the slats lie more or less in a vertical plane. For this purpose, a tilter is customarily provided on the head bar and is actuated by a tilt cord, the depending ends of the tilt cord hanging downwardly adjacent an end of the head bar for convenient operation of the tilter. The machine and method of the present invention relate to the cutting of the ladder tapes, lift cords, and tilt cords to the proper length for assembly in a blind of predetermined height, width, and height above the floor level.

In the manufacture of so-called "custom" Venetian blinds, which are made to the customer's order, it is usual to measure the window height and width and the height of the window sill or bottom of the blind above the floor. The slats, head bar, and bottom bar are cut slightly shorter than the width of the window opening to provide clearance for an "inside" mounted blind, i. e. one in which the blind is mounted between the window jambs. These parts are cut somewhat longer than the width of the window opening for an "outside" mounted blind, i. e., one in which the blind is mounted on the wall surface and extends across the window opening.

The length of the ladder tapes of a blind depends not only upon the height of the blind but also upon the hardware, e. g., head bar and bottom bar fittings that are to be used, and also upon whether or not hold-down brackets are to be used. The lift cord length depends not only upon the height and width of the blind but also upon the sill height (height of the bottom bar from the floor) so as to assure that the depending ends of the lift cords are not excessively long but yet may be readily grasped by the operator. The length of the tilt cord depends upon the height of the blind plus the sill height.

Tables for indicating and formulas for calculating proper length of ladder tapes, lift cords, and tilt cords for the commonly used sizes of blinds, and correction factors for various head bar and bottom bar fittings have been available to the industry; but such tables necessarily cannot cover all sizes of blinds. In any event, it is necessary in using such tables to make corrections for sill height and different designs of fittings.

According to the machine and method of the present invention, the distance between a pair of fixed stations representing the two ends of the ladder tapes may be varied in accordance with height of the blind, the machine being initially set for blind height and being adjustable so as to compensate for different designs of fittings. Likewise, the length of lift cord between two fixed stations is determined by the adjustment of the machine for blind height and also by adjustment of the machine for blind width and for sill height. The length of tilt cord between two fixed stations is determined by the adjustment of the machine previously made for blind height and sill height.

The precise construction and arrangement of the machine for accomplishing the above general purposes is set forth in the detailed description to follow, it being borne in mind that, according to the machine and method of the present invention, adjustment of the machine for the cutting of either ladder tapes, lift cords, or tilt cords enters into not only the determination of the particular component being cut, but also the other component or components to be cut.

Among the objects of the present invention are to provide an improved apparatus and method for cutting ladder tapes to proper length, for cutting lift cords to proper length, and for cutting tilt cords to proper length, all in accordance with blind size and sill height; to provide such an apparatus in which the number of adjustments of the machine required for the cutting of the above components are minimized; and to provide an improved apparatus for locating and assembling bottom bar anchors on the ends of the ladder tapes.

Further objects and objects relating to details and economies of construction, manufacture, assembly and use will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best mode in which I have contemplated carrying out my invention is illustrated in the accompanying drawings forming part of this specification, in which:

A part of this portion of the machine has been broken away for convenience of illustration.

Venetian blinds are often made to individual window measurements in order to obtain a perfect fit of the blind in the window opening; such blinds are known in the Venetian blind industry as "custom" blinds. Regardless of whether the particular blind is mounted in the opening between the jamb surfaces of the window ("inside" mounted) or whether the blind is mounted on the face of the frame of the window or on the inside wall of the room ("outside" mounted), it is customary in both instances to measure the window opening. Then, if an "outside" mounted blind is desired, a fixed increment of several inches is added to the window opening dimension. Both the height H and width W of the window opening is measured (see Fig. 29). With an "inside" mounted blind the length of the ladder tapes of the blind varies directly with the height of the window opening. With an "outside" mounted blind the length of the ladder tape varies directly with the height of the window opening plus a fixed increment. The length of the lift cords of the blind depends in part on the height of the window opening and in part on the width of the window opening. In addition, so that the end of the lift cords depending from the head bar may be grasped for raising the blind and will remain within easy reach at all times, the height S of the opening above the floor (sill height) is a factor to be considered in determining length of the lift cords. The length of the lift cord for a compound lift blind will likewise depend on the height H' and width W' of the window opening and the sill height S'; see Fig. 30. The length of the tilt cord will depend on the height of the window opening and the sill height, there also being a minimum length of tilt cord required in order to tilt the blind fully in each direction. In addition, the precise length of ladder tape, lift cords, and tilt cord will depend to some extent on the specific design of the hardware with which the ladder tapes and the lift and tilt cords are to be assembled; also the particular shop standards in respect of the desired height of the lift and tilt cords above the floor, etc.

Figure 29:
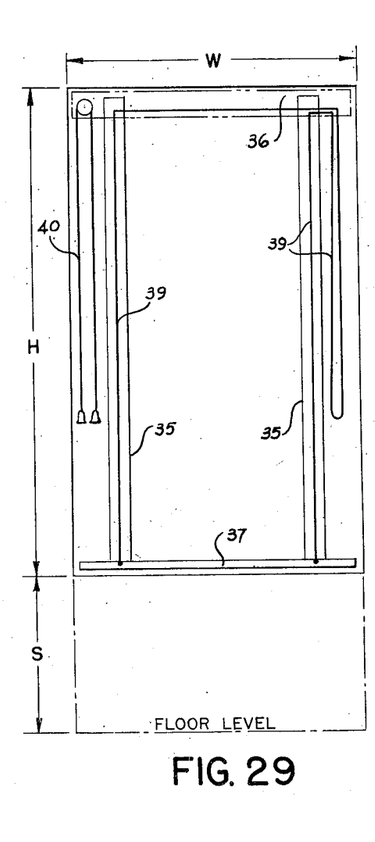
Fig. 29 (sheet 11) is a diagrammatic elevation of a portion of a wall, showing a window opening with a two-lift cord Venetian blind mounted in the opening.

Fig. 29 diagrammatically indicates how the cords are reeved in a conventional two-lift-cord Venetian blind of the enclosed head-bar type, in which the operating mechanism is contained within a more or less enclosed head bar such as shown in Nelson U. S. Patent 2,629,434 of February 24, 1953. In such a blind, the length of the ladder tapes 35, 35 will not be precisely the height H of the window opening but will be either lesser or greater by a small amount, depending on the specific construction of the head bar 36 and bottom bar 37 used and the clearance between the bottom bar and the window sill. This difference between the length of the ladder tapes and the height of the window opening will be a constant or fixed amount depending upon the specific design of head bar and bottom bar, and will not vary with the height of window opening. Outside of the factor allowed for the specific design of head bar and bottom bar used, the only other factor which might vary this amount would be the clearance desired between the bottom bar and the window sill, which is usually maintained uniform except when hold-down bracket, such as shown in Nelson U. S. Patent 2,614,784 of October 21, 1952, are used, in which instance greater clearance is usually allowed between the window sill and the bottom bar.

Figure 30:
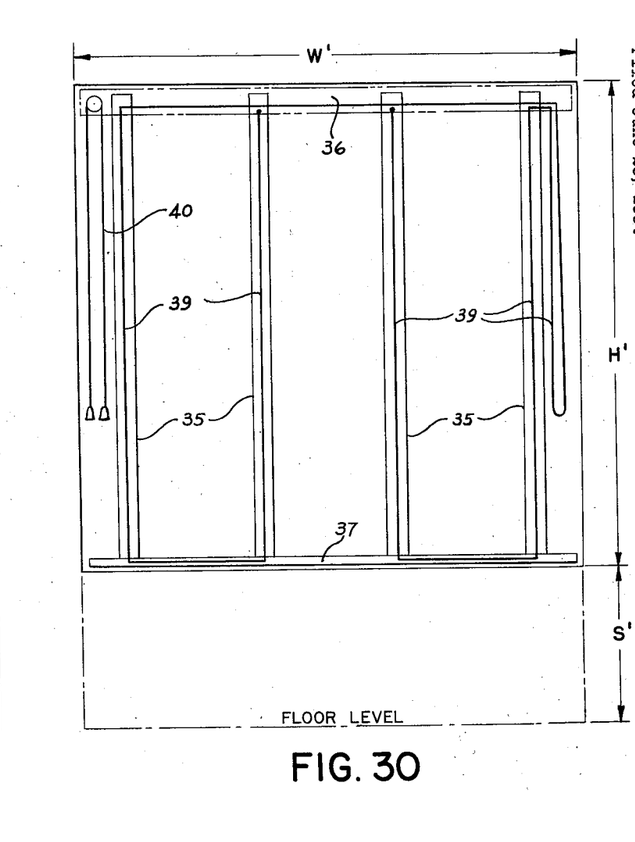
Fig. 30 (sheet 11) is a view similar to Fig. 29 showing a compound lift cord blind mounted in the opening.

The lift cords 39, 39 of Fig. 30 are actually, in normal practice, a single length of cord reeved through the head bar 36 and having a depending loop hanging from the right end of the head bar which is grasped for raising or lowering the blind. The length of cord to be cut for the lift cords 39, 39 varies not only with the height H of the opening, but also with the width W of the opening, since these cords run horizontally within the head bar 36. Likewise, the vertical runs of the lift cords 39, 39 do not extend the complete height of the window opening but are lesser by a fixed amount depending on the specific design of head bar and bottom bar.

The horizontal runs of the lift cords 39, 39 vary with the width of the window opening and also by the distance of the cord lock from the end of the head bar. However, it is usual practice to maintain the distance of the cord lock from the end of the head bar uniform in any particular blind manufacturing plant. In addition, the length of the depending looped end of the lift cords varies not only with height of the window opening but also with sill height S, so as to assure that the end of the cords will always be within easy reach.

The tilt cord 40 ordinarily consists of a single length of cord reeved over a tilt cord pulley within the head bar 36. The length of the tilt cord 40 varies with the height H of the window opening and also with the sill height S to assure that both ends of the cord will always remain within easy reach of a person operating the blind. In addition, sufficient length of tilt cord must be provided to operate the tilter for tilting the slats of the blind to fully closed position in either direction.

In a compound lift blind, such as shown in Fig. 30, the lift cords 39 are reeved as indicated, the length of lift cord required varying with both height H' and width W' of the window opening as well as sill height S'. In a compound lift blind, the ladder tapes and tilt cord are just the same length with respect to the sill height and height of the window opening as in a two-lift-cord blind, a two-lift-cord blind being indicated in Fig. 29.

The machine of the present invention is adapted for the proper measuring and cutting of ladder tapes, lift cords, and tilt cords for any blind within a wide range of sizes; and it compensates for difference in sill heights, solely by simple and easy adjustment of the machine for width and height of window opening and for sill height. In addition, there are certain normally fixed adjustments of the machine that are made to provide for the so-called "fixed variables," such as specific design of hardware used, distance of the cord lock from the end of the head bar, height of bottom bar above the window sill, and other variables that are maintained more or less uniform in all manufacture of blinds by a particular Venetian blind shop. The machine also prepares the ends of the ladder tapes for attachment to the head bar and bottom bar of the blind.

The machine

Figure 1:
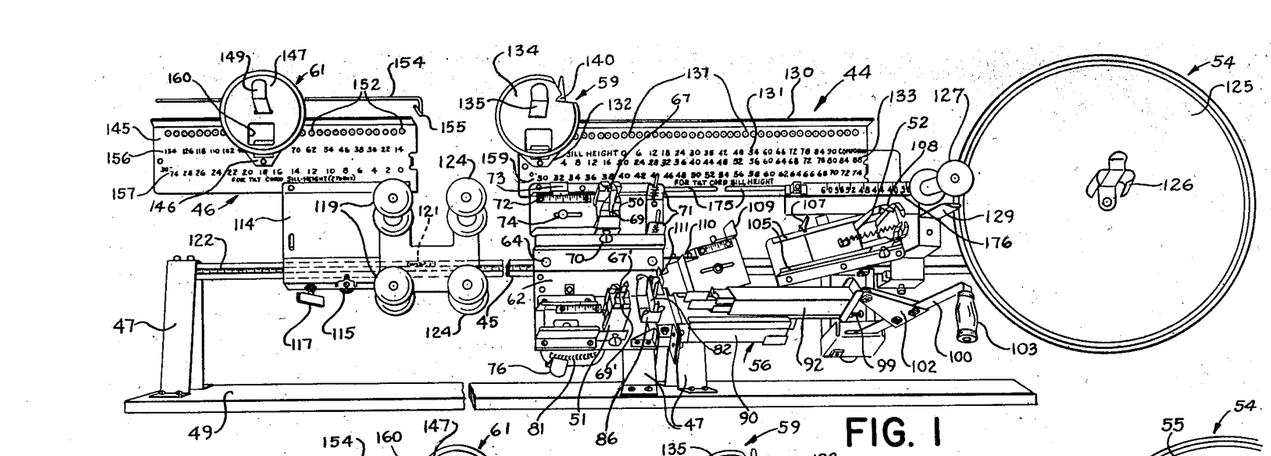
Fig. 1 (sheet 1) is a front perspective view of the machine of the present invention, a portion of the horizontal supporting bar being broken away for convenience of illustration.
Figure 2:
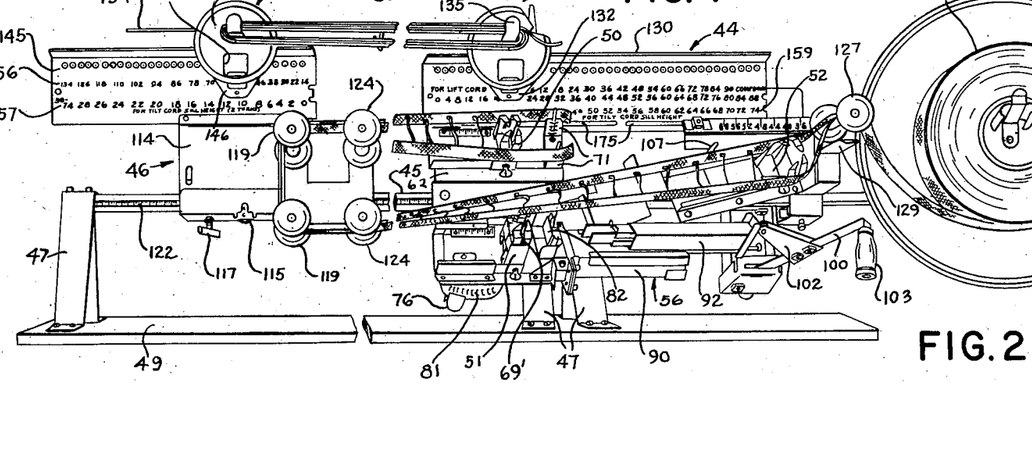
Fig. 2 (sheet 1) is a view similar to Fig. 1, showing a preliminary step in measuring a ladder tape for a blind, and also showing the measuring of a lift cord for the same blind.
Figure 3:
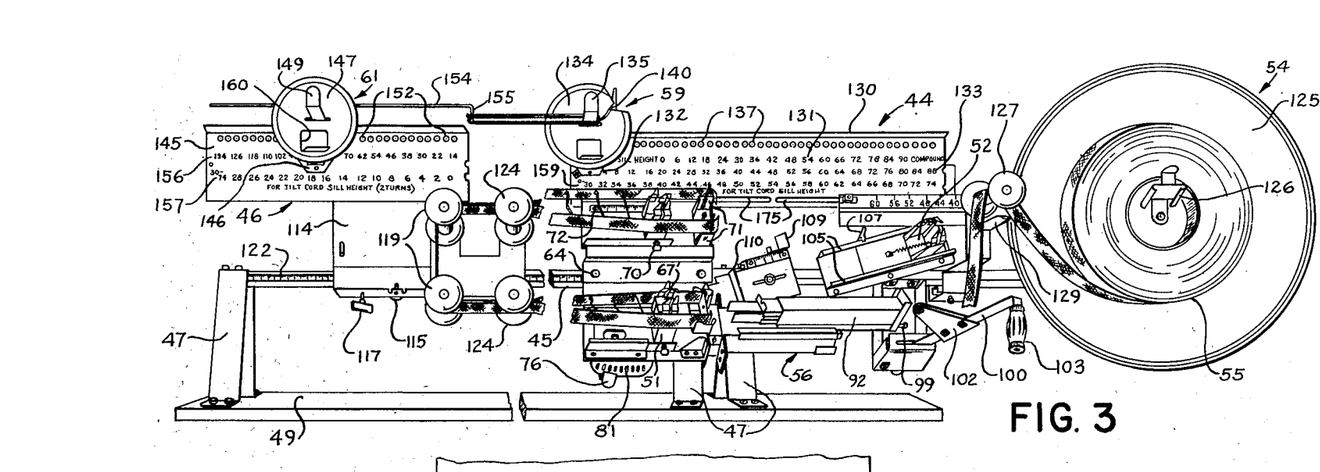
Fig. 3 (sheet 2) is a view similar to Fig. 2, showing a further step in the measuring of the ladder tape shown in Fig. 2, and also showing the measuring of a tilt cord for the same blind.
Figure 6:
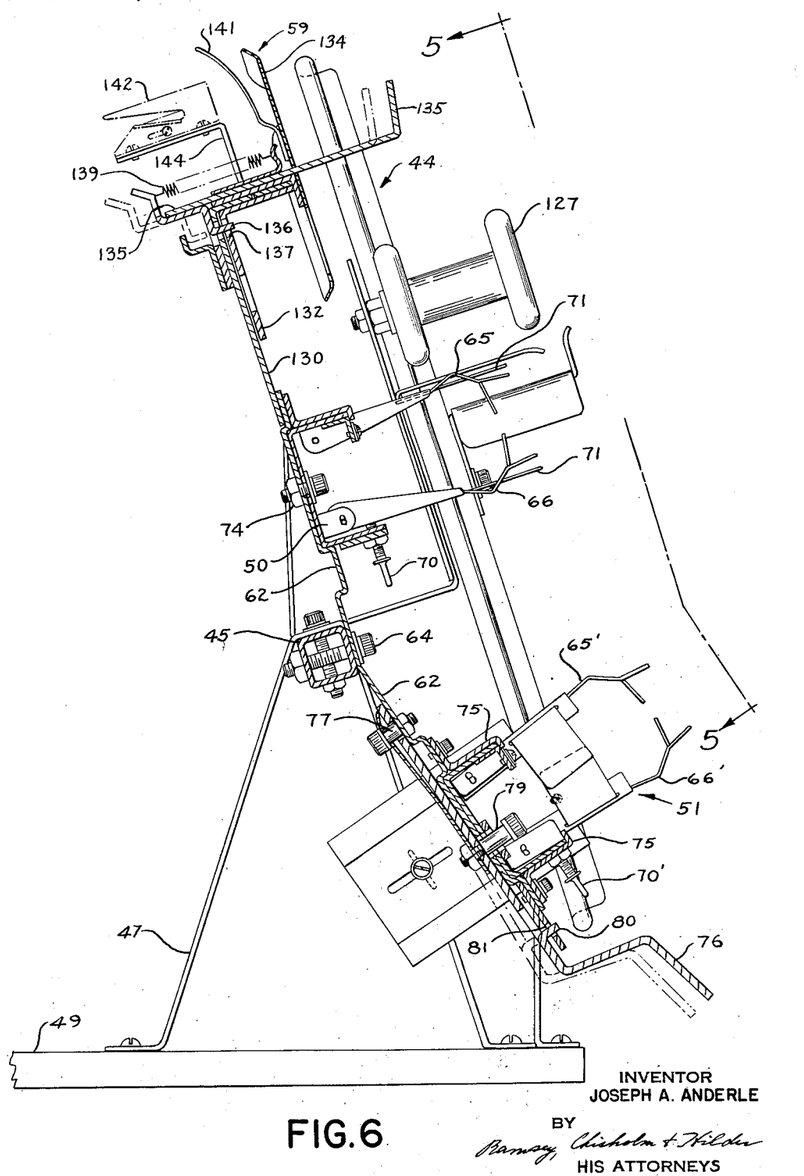
Fig. 6 (sheet 4) is a vertical section of the machine taken generally along the line 6—6 of Fig. 5.

The general organization of the tape and cord measuring machine is best seen in Figs. 1, 2 and 3. The machine comprises a fixedly mounted right-hand unit, generally indicated as 44, which is mounted on a horizontally extending support 45, and a left-hand unit or carriage, generally designated as 46, which is movable along the support. The support 45 is mounted on two or more supporting members 47 which may be fastened to the top of a table or bench 49 for the convenience of the operator. Both units 44 and 46 are rearwardly-upwardly inclined as is seen in Fig. 6 in respect of unit 44.

The right-hand unit 44 includes a fixture 50 for receiving the upper end portion of the ladder tape, a fixture 51 for receiving the lower end portion of the ladder tape, and a fixture 52 for receiving the ladder tape during cutting thereof, all of these parts preferably being fixed with respect to the support 45 and settable only within narrow limits to provide for different designs of hardware or to properly tension the ladder tape, as will be explained. The right-hand unit of the machine also includes a bottom bar fitting clinching mechanism which is designated as 56, a cord cutter, and a right-hand cord gauge unit generally designated as 59. In addition, tape-dispensing reel 54, which may also be rearwardly, upwardly inclined, may be mounted on the right-hand end of the support 45 to serve as a convenient support for a coil 55 of ladder tape.

The left-hand unit or carriage 46 of the machine is readily adjustable as a unit along the length of the support 45 and has two pairs of ladder-tape-receiving pulleys for receiving a bight of ladder tape extending in two generally horizontal runs from the fixture 50, about the pulleys, and to the fixture 52 or 51, as will be explained. In addition, the left-hand unit 46 includes a left-hand cord gauge unit 61 which is used in conjunction with the gauge 59 for measuring the proper length of lift cord and tilt cord for a Venetian blind that is to be installed in a window opening of specific height, width, and sill height.

Tape-measuring portion

Figs. 1, 2, 3, 5 and 6 will be referred to first. The right-hand unit 44 of the machine is provided with a platelike frame 62 which may be secured to the support 45 by bolts 64, 64. The frame 62 has the ladder-tape fixture 50 mounted thereon. The fixture 50, which is particularly adapted to receive a ladder tape, has a pair of confronting elements 65 and 66, the upper ends of the elements converging somewhat and being bifurcated to provide slots 67 and 69, respectively, for receiving the cross tape or rung of a Venetian blind ladder tape. Preferably, the element 66 is pivotally mounted and spring-biased away from the element 65 to facilitate the application of ladder tape to the fixture. A thumb screw 70 limits movement of the element 66 away from the element 65, the thumb screw being adjusted for different sizes of ladder tape so that the distance between the tape-receiving portion of the elements 65 and 66 is maintained slightly greater than the length of a ladder tape rung. The slots 67 and 69 extend sufficiently far so that the ladder tape may be inserted into the fixture with the branches of the ladder tape lying beyond the converging portions of the elements 65 and 66, the converging portions serving only to aid in placing the tape on the fixture.

A pair of spaced, parallel, tape-loop-forming posts 71, 71 is affixed to the frame 62 to the right of the fixture 50, the construction being such that the ladder-tape branches extending from the fixture may be individually folded back on themselves about the respective posts 71, 71, as indicated in Fig. 3, and stapled or otherwise secured to form a terminal loop for the upper end of each ladder-tape branch a fixed distance from the first cross tape or rung of the ladder tape, which is received within the slots 67 and 69 of the fixture. Any intervening cross tapes, if not previously cut from the tape branches, may be cut out before forming the loops. Normally, the loops at the upper end of the ladder tape will not be formed until after the tape has been severed from the roll of tape 55 and engaged with the fixture 51, as will be explained.

The fixture 50 is adjustable as a unit towards or away from the loop-forming posts 71, 71 to provide for forming ladder tapes with terminal loops at varying distances from the topmost rung of the ladder tape, such distance being uniform for any particular design of head-bar channel, but varying for different designs of channel and operating mechanism. A scale 72 mounted on the fixture 50 registers with an index 73 on the frame to indicate the length of the terminal loops from the topmost rung of the ladder tape, and a bolt 74 holds the fixture in adjusted position.

Figure 14:
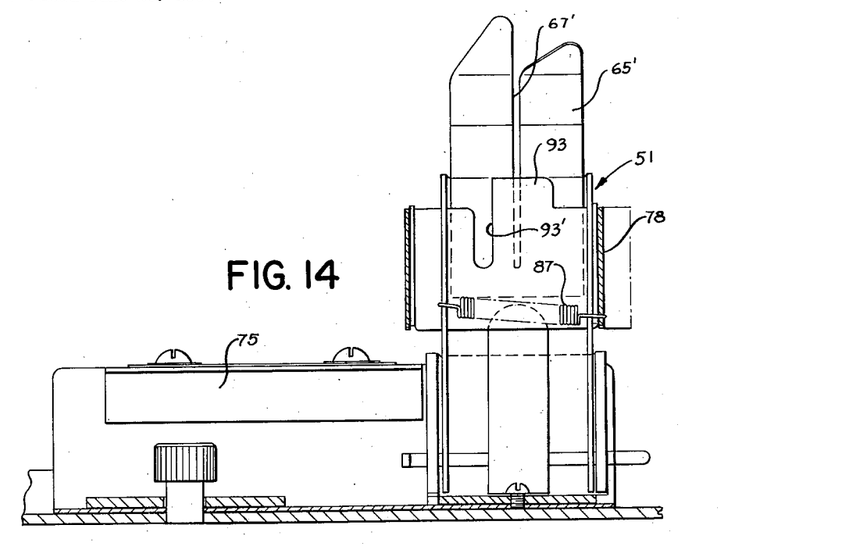
Fig. 14 (sheet 8) is a section through the fixture for receiving the bottom-bar-engaging end of the ladder tape, taken generally on the line 14—14 of Fig. 5.
Figure 15:
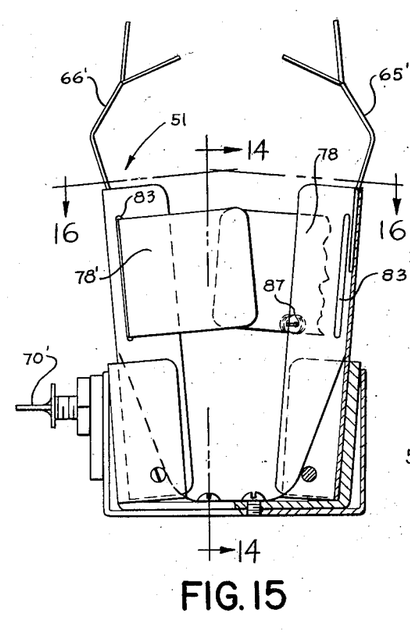
Fig. 15 (sheet 8) is a right side view of the fixture shown in Fig. 14, part being in section for clarity of illustration.
Figure 16:
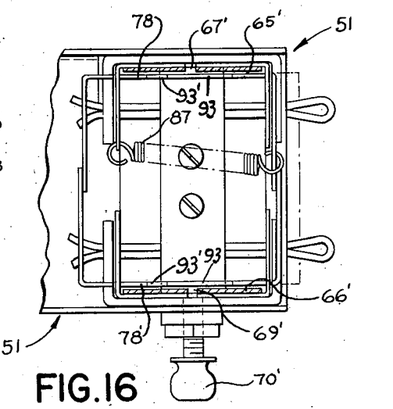
Fig. 16 (sheet 8) is a horizontal section taken on the line 16—16 of Fig. 15.

The fixture 51 for receiving the bottom-bar-end-portion of the ladder tape is generally similar to the fixture 50. It has opposed, confronting elements 65' and 66' which are bifurcated to provide slots 67' and 69' and has a thumb screw 70', the parts functioning similarly to the correspondingly numbered parts of the fixture 50. However in the fixture 51, a pair of U-shaped members 78 and 78' (Figs. 15 and 16) have their bases received for reciprocatory movement within slots 83, 83 in the flanges of the elements 65' and 66', the legs of members 78 and 78' being more or less telescoped at all times for simultaneous movement of both of these parts. A tension spring 87 biases the members 78 and 78' to the left (as seen in Figs. 14 and 16), in which position an elevated portion 93 (Fig. 16) of each member closes the lower ends of slots 67' and 69' respectively. When the members 78 and 78' are moved to the right against the bias of the spring 87, lower portions 93', 93' of the members register with the slots 67' and 69' to open the slots for their full depth for the reception of a cross rung of the ladder tape. The cross tapes of ladder tape are usually staggered, and by the above-described mechanism, the tape may be placed always at the same elevation on the fixture 51, the members 78 and 78' being moved to the right to uncover the full depth of slots 67' and 69' when the cross tape is adjacent the lower edges of the tape branches. When a cross tape adjacent the upper edges of the tape branches is received in slots 67' and 69', the members 78 and 78' are allowed to remain in their left-hand position, the cross tape then resting upon the upper edge of portion 93.

The fixture 51 is mounted in guides 75, 75 (see particularly Figs. 5 and 6) for movement in a direction parallel to the length of the support 45, the fixture being moved along the guides by a lever 76 having its upper end pivotally mounted on the frame 62 by a bolt 77, and its intermediate portion pivotally mounted on the fixture by a bolt 79 received within an arcuate slot (not shown) within the frame to permit limited oscillation of the lever. A tongue 80 projecting from the lower portion of the lever 76 is receivable within any of the series of slots 81 formed in the lower portion of the frame 62, the lever being biased against the underside of the frame but being displaceable away from the frame to retract the tongue 80 from the slot 81 in which it is engaged and permit oscillation of the lever to move the fixture along its guides.

The purpose of moving the fixture 51 is to take out any slack in the tape between the fixtures 50 and 51 and to tension the ladder tape to the approximate tension that it will be subjected to in use due to the weight of the slats and bottom bar of the blind, most ladder tapes being formed of woven textile material and being stretchable in some degree. The fixture 51 having once been adjusted for tensioning the ladder tape of a particular length blind, the adjustment of the fixture is not changed and, therefore, all the tapes of that blind and blinds of the same size and made at that time will be formed with the same distance between the lowermost rung or cross tape and the bottom bar anchor or fitting, as will be described. The series of slots 81 permit the operator to position the fixture 51 in increments of one-eighth of an inch so as to obtain a precise length of ladder tape.

A bottom bar anchor fixture 82 (see Figs. 2, 4, 11, 12, 13, 19 and 20) is located a short distance to the right of the tape fixture 51, the fixture 82 being provided for the purpose of supporting a bottom bar anchor during its attachment to the ladder tape. The fixture 82 is fixed to the frame 62 and is not adjustable.

Figures 17, 18:
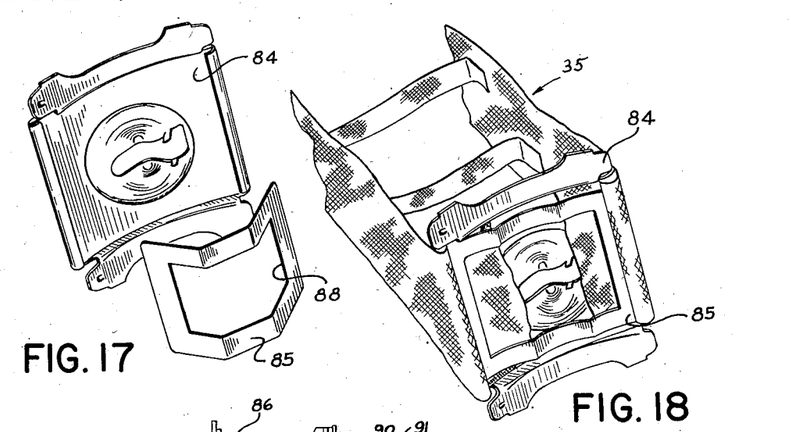
Fig. 17 (sheet 9) is an exploded perspective view of one form of tape anchor for attachment to the lower end of a ladder tape by the machine of the present invention.
Fig. 18 (sheet 9) is a perspective view of the fitting of Fig. 17 after the ladder tape has been secured to the fitting.

The fixture 82 is shaped to receive the bottom bar anchor body 84, shown in Fig. 17 of the drawings, and to hold the ends of the branches of the ladder tape 35 folded about the anchor and in position for securing by the dead soft steel tape clamp 85 of the anchor. This bottom bar tape anchor is more completely described and claimed in the U. S. patent application of Joseph A. Anderle S. N. 371,960.

Figure 19:
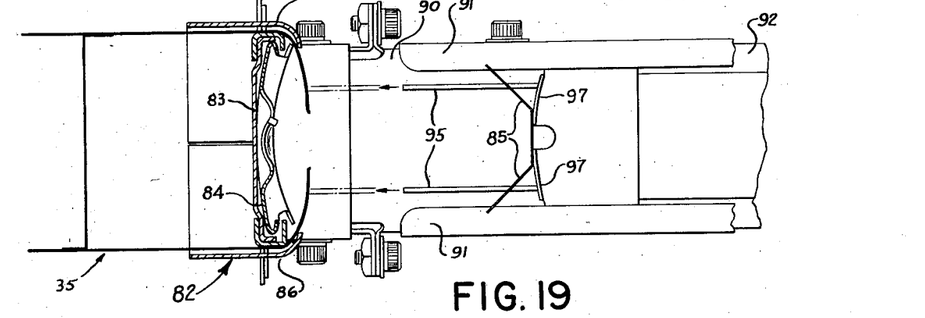
Fig. 19 (sheet 9) is an auxiliary view of the portion of the machine for attaching the fitting of Fig. 17 to a ladder tape, the fitting and fixture being shown in section. The ladder-tape end is shown, with the fitting in place for attachment thereto.
Figure 20:
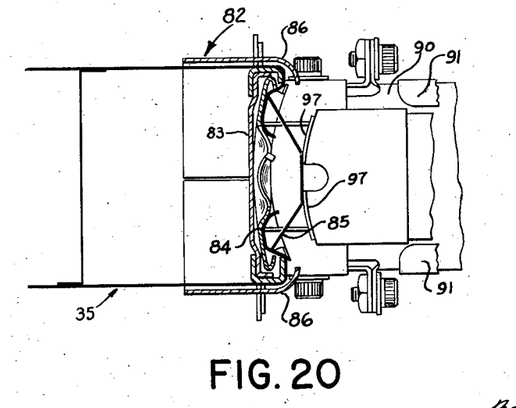
Fig. 20 (sheet 9) is a view similar to Fig. 19 showing the fitting in the process of attachment to the ladder-tape end.

The fixture 82 includes an upstanding, generally channel-shaped member 83 having a cross section as indicated in Figs. 19 and 20, the body 84 of the anchor being received and supported within the fixture as indicated. The fixture 82 also has a pair of opposed, inwardly curving, side members 86, 86 lying outside of the channel-shaped portion 83 of the fixture, the ends of the ladder tape branches extending from the fixture 51 being entered from above between the members 86, 86 and the channel-shaped portion of the fixture so as to direct and hold the branches of the ladder tape extending about the anchor, as generally indicated in Fig. 19, in order to position the ends of the ladder tape branches to receive the tape clamp 85.

The fixture 82 is adjustable to vary the height at which the bottom bar anchor body 84 is supported relative to the fixture 51. The distance of the cross tapes in from the edges of the longitudinal tapes varies in ladder tapes of different manufacturers and this adjustment assures that the tape will be aligned with a fitting supported within the fixture 82. This adjustment is obtained by providing longitudinal slots (not shown) to receive the bolts for mounting the fixture 82.

Figures 11, 12, 13:
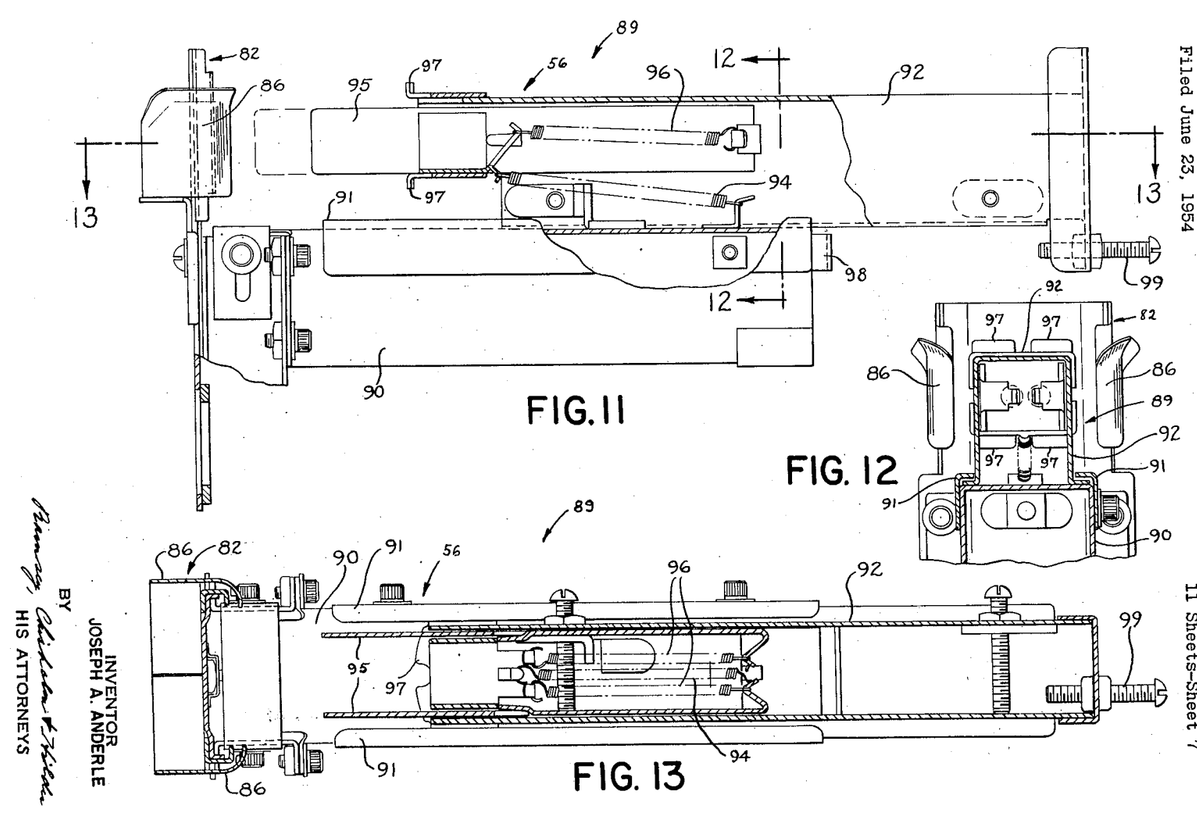
Fig. 11 (sheet 7) is an elevation of the fixture and mechanism for securing one end of the ladder tape to the bottom-bar anchor, part being in section for clarity of illustration.
Fig. 12 (sheet 7) is a view of the fixture and mechanism shown in Fig. 11, taken as indicated generally by the line 12—12 in Fig. 11.
Fig. 13 (sheet 7) is a horizontal section taken on the line 13—13 of Fig. 11.

The ductile tape clamp 85 is applied by a presslike, bottom-bar-anchor-attaching assembly 56 which is secured to the right of the bottom bar anchor fixture 82 as viewed in Figs. 1–3. This assembly comprises a stationary track 90 having guideways 91, 91 (Figs. 4, 11, 12, 13 and 19) for supporting a ram 92 for movement along the track towards and away from the fixture 82. The ram 92 is biased towards retracted position away from the fixture 82 by a tension spring 94 (Figs. 11, 12, and 13).

A support comprising bladelike legs 95, 95 is reciprocably mounted within the ram 92 for supporting the tape clamp 85 of the bottom bar anchor 84, this support comprising a U-shaped formation, the parallel bladelike legs 95, 95 of which extend towards the fixture 82 and are of such size and so spaced as to be received within the rectangular opening 88 within the tape clamp 85. The support is biased by helical springs 96, 96 to the position shown in Fig. 11, with the bladelike legs 95, 95 extending from the end of the ram 92. These parts are so arranged that, when the ram 92 is forced towards the ends of the ladder tape and the fitting 84 is supported within the fixture 82, the ends of the blades 95, 95 first press the ends of the ladder tape against the inside surface of the anchor member 84 as indicated in Fig. 19. Then, as the ram 92 continues to move towards the fixture 82, it carries the tape clamp 85 along the blades 95, 95 before it and presses the tape clamp against the tape and fitting as shown in Fig. 20. Finally, the ram 92 more or less flattens the tape clamp 85 by pressure from the transversely curved end surfaces 97, 97 of the ram above and below the blades 95, 95 to clamp the ends of the ladder tape firmly within the anchor 84. The ram 92 is adjustable in its mounting on the fixture 82, both for height and laterally, so as properly to apply the tape clamp 85 to the anchor body 84, the tape clamp being inserted within the concave underside of the anchor body.

Figure 8:
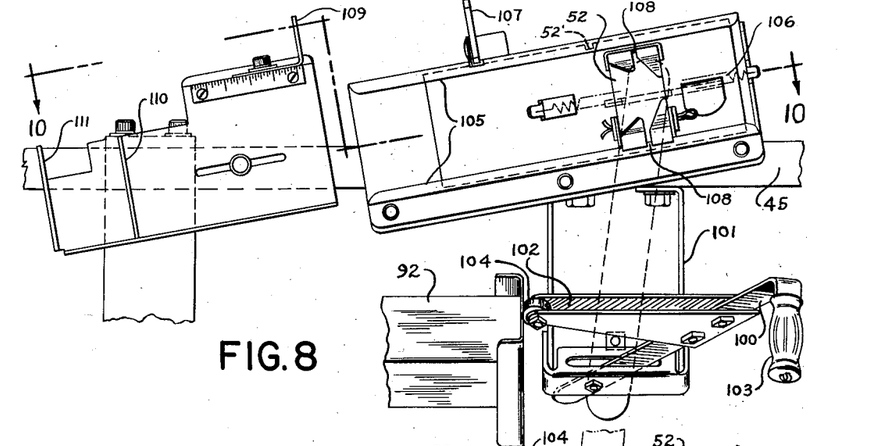
Fig. 8 (sheet 6) is a view similar to Fig. 5 of the fitting for receiving the ladder tape preliminary to cutting to length, together with the associated parts.
Figure 9:
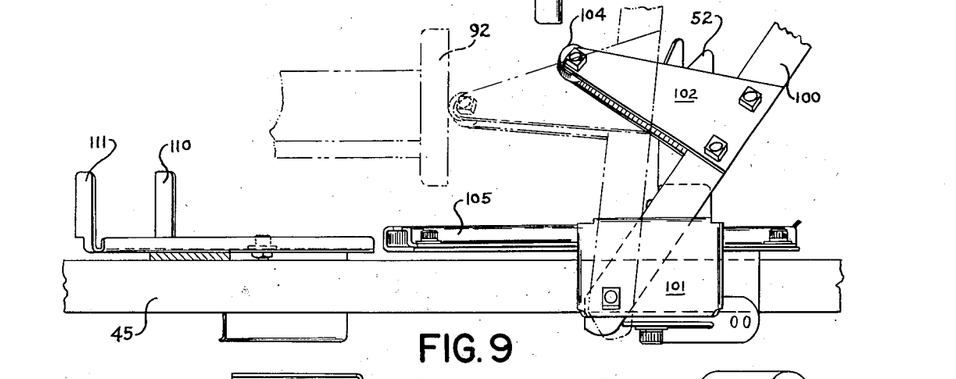
Fig. 9 (sheet 6) is a view similar to Fig. 8 taken from a plane parallel to the bottom of the guide.
Figure 10:
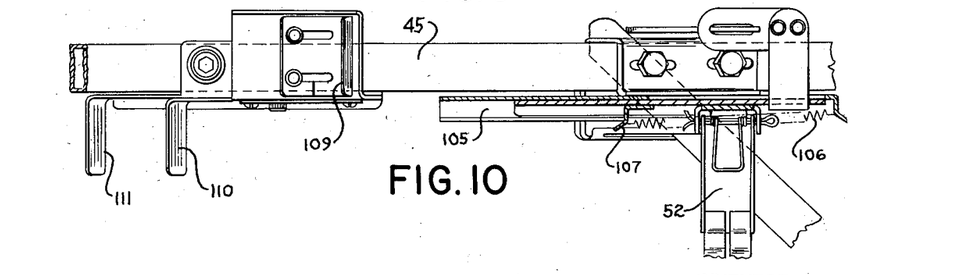
Fig. 10 (sheet 6) is a section view taken generally along the line 10—10 of Fig. 8.

The ram is moved by a lever 100 (Figs. 1–3) pivotally mounted in a lever support 101 secured to the horizontally extending support 45 (Figs. 8 and 9). The lever 100 is provided with a laterally extending portion 102 terminating in a roller 104 pivotally mounted at the end of the portion 102 and rolling against the end of the ram 92 as the lever 100 is oscillated by hand. The end of the lever 100 is provided with a handle 103 so that the operator can manually operate the ram 92. A set screw 99 (Fig. 11) at the right-hand end of the ram 92 engages abutment 98 on the member 90, when in its advanced position, to limit the movement of the ram towards the fixture 82.

The fixture 52 (Fig. 8) for receiving the ladder tape during cutting thereof is generally similar to the fixture 50 previously described for receiving the head-bar-end-portion of the ladder tape, and has slots 108, 108 for reception of a cross tape of the ladder tape. The fixture 52 is supported in a pair of parallel guides 105, 105 mounted on the horizontally extending support 45 adjacent the lever support 101, the guides being canted somewhat downwardly to the left, as indicated in the drawings, for a reason to be explained. The fixture 52 is biased to the right, as viewed in the drawings, along the guides 105, 105 by a tension spring 106 so as to hold the ladder tape reasonably taut during cutting. The fixture 52 is initially held to the left against the bias of the spring 106 by a pivotally mounted latch 107 which is received within a slot 52' within the base of the fixture 52. After the tape is engaged with the fixture 52, the latch 107 is depressed to release the fixture for movement to the right.

A series of gauge members 109, 110, and 111 are provided for indicating to the operator where the tape extending from the fixture 52 is to be cut and over what range along the length of the tape the cross ladders are to be severed from the tape. All of these gauge members preferably are adjustable towards and away from the fixture 52 for indicating proper cutting of tape for different designs of hardware. The use of these gauge members in the cutting of a Venetian blind ladder tape will be explained later.

The left-hand unit 46 (Figs. 1–3) of the machine includes a platelike frame or carriage 114 (Fig. 7) which is slidably mounted for movement along the horizontal support 45. A pair of rollers 115, 115 mounted on the carriage 114 above the support 45, and a single roller 115 below the support 45 provide for easy movement of the carriage along the support, and a clamp 116, adapted to engage against the support 45 and operated by a thumb screw 117, serves to hold the carriage 114 in any adjusted position along the length of the support.

The carriage 114 is provided with means to receive a bight of ladder tape, this means preferably consisting of a pair of pulleys 119, 119, each having a cylindrical surface at least as wide as the width of the ladder tape. The pulleys 119, 119 are mounted for rotation on axles 120, 120 extending generally perpendicular to the general plane of the carriage 114.

If desired, a second set of ladder tape pulleys 124, 124 may be mounted a short distance to the right of the pulleys 119 to measure ladder tapes for blinds for shorter window openings, as will be explained.

An index point 121, mounted on the carriage 114, registers with a scale 122 extending lengthwise of the horizontal support 45 to indicate the proper setting of the left-hand unit 46 of the machine for gauging a ladder tape of proper length for a window opening of known height. The index point 121 may be mounted for adjustment relative to the frame 114 for calibration of the machine and to provide slightly shorter ladder tapes where the blind is to be used with hold down brackets.

The tape-dispensing reel 54 (Figs. 1–3) preferably comprises a generally circular plate 125 having a central support 126 for receiving the roll of ladder tape 55, as indicated in Fig. 2. A ladder tape pulley 127, which may be similar to the pulleys 119, is located to the left of the tape-dispensing reel 54 and serves to support the tape as it is taken from the roll 55. If desired, a tape support 129 may be located immediately below the pulley 127. The function of this support is explained in connection with operation of the machine. If plastic ladder tape is to be measured instead of textile tape, the rectangular carton in which the plastic tape is usually packed may be mounted on the plate 125 in lieu of the roll of tape 55.

Cord-measuring portion

The cord-measuring portion of the machine is located along the top of the right- and left-hand units 44 and 46 (Figs. 1–3). Inasmuch as the height of the window opening is a factor in the required length of lift cord, a single setting of the machine for height of window opening not only sets the machine for correctly measuring ladder tapes, but also sets that factor into the machine for correctly measuring lift cords.

The lift-cord-measuring portion of the right-hand unit 44 comprises a generally flat plate 130 (Figs. 5 and 6) which is secured to the frame 62 of the right-hand unit.

A right-hand cord gauge unit 59 is mounted for sliding movement along the top edge of the plate 130. This unit includes a slide 132, a generally circular plate 134, and a plunger or detent 135 projecting from the plate 134 and having an offset lower portion 136 biased into any one of a row of holes 137 along the plate 130. A spring 139 biases the plunger 135 forwardly so as to retain the portion 136 of the plunger within one of the holes 137 so as to retain the cord gauge unit in adjusted position along the plate. The plate 130 is provided with a scale 131 calibrated in inches of sill height for use in connection with the gauging of direct-acting lift cords.

The plate 134 of the cord gauge unit 59 is provided with a notch 140 and a cord holder 141 projecting from the rear side of the plate and, together with the notch, serving to frictionally hold a cord within the notch and between the cord holder and the plate 134. A cord cutter 142 is mounted on a cord cutter bracket 144 projecting from the rear of the cord gauge unit 59, the cord cutter preferably being similar to that shown in Smith patent application S. N. 339,959, now Patent 2,726,448.

The cord-measuring portion of the left-hand unit 46 (Figs. 1, 2, 3, 7 and 23) comprises a generally flat plate 145 secured to the top edge of the frame 114 of the left-hand unit or carriage 46. The plate 145, which is generally similar to the plate 130 of the right-hand unit, has a left cord gauge unit 61 mounted for movement along the top edge of the plate 145. The left cord gauge unit 61 is generally similar to the right cord gauge unit 59 except that it is not notched, and is not provided with a cord holder or cord cutter. The left cord gauge unit includes a slide 146, a generally circular plate 147 and a plunger 149 which projects from the plate 147, the plunger having an offset rearward portion or detent that is biased by a spring into one of a series of holes 152 adjacent the top edge of the plate 145. By pressing the plunger inward the left cord gauge unit 61 may be adjusted anywhere along the length of the plate 145.

A tilt cord hook 154 is clamped to the cord gauge unit 61 behind the plate 147, the hook extending towards the right as viewed in Fig. 1 and terminating in a transverse end portion, the mounting of the hook on the cord gauge unit permitting adjustment of the hook towards the left or right for a purpose to be explained.

Figures 7, 22, 23:
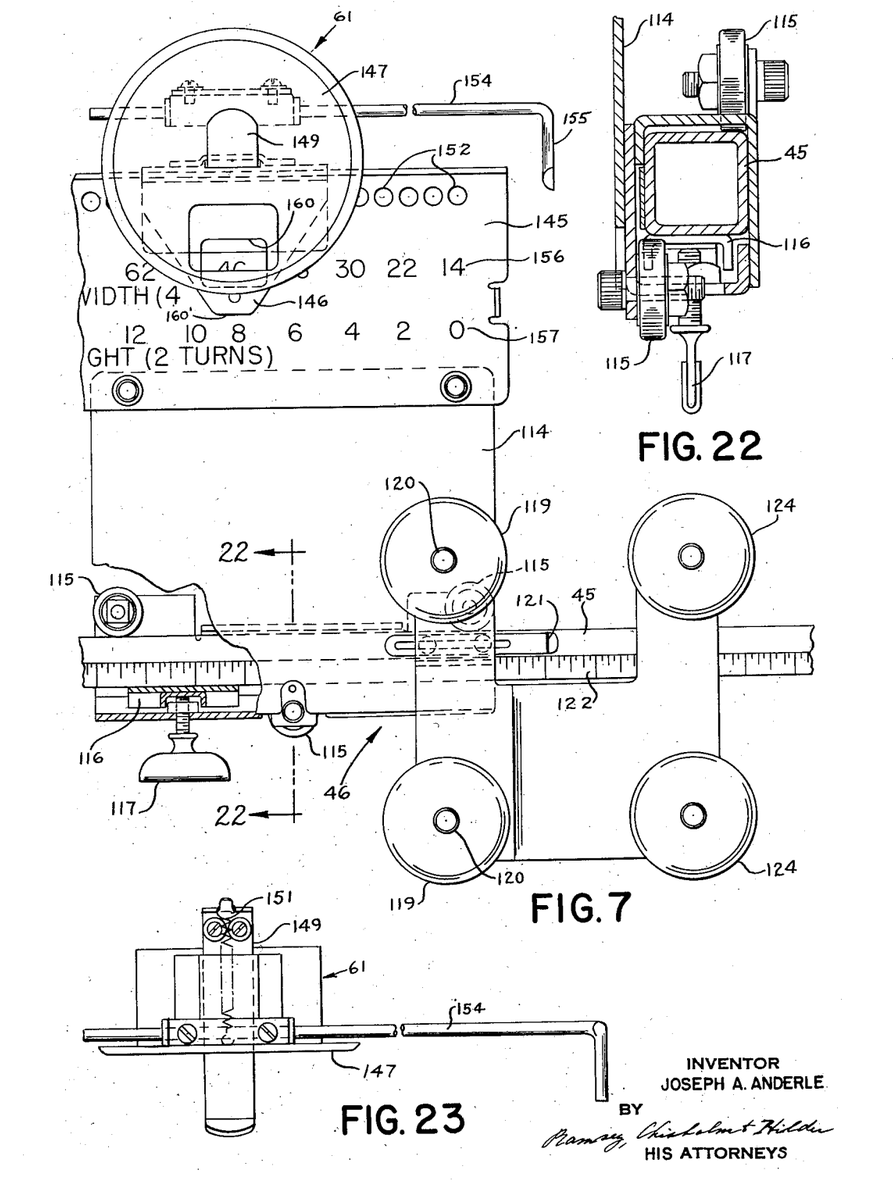
Fig. 7 (sheet 5) is a view similar to Fig. 5 of the left-hand portion of the machine, showing the ladder-tape-receiving part and the cord-receiving part of this portion.
Fig. 22 (sheet 5) is an enlarged fragmentary vertical section of the left-hand unit of the machine and horizontal guide taken on the line 22—22 of Fig. 7.
Fig. 23 (sheet 5) is an auxiliary detail view of the cord gauge and associated parts of the left-hand unit of the machine.

The plate 145 is provided with a scale 156 calibrated in inches of width of window opening for measuring direct-acting lift cords, and a scale 157 calibrated in inches of sill height for measuring tilt cords. As shown in the drawings, the scale 157 extends only up to 30 inches of sill height and is continued on a scale 159 on the plate 130 of the right-hand unit 44. As seen in Fig. 7, slide 146 of the left gauge unit 61 is provided with an opening 160 which registers with the numbers constituting the scale 156 and is provided with a nose portion 160' which registers with the numbers constituting the scale 157.

OPERATION

Cutting of the ladder tape

In the measuring of ladder tape for a blind which fits within a window opening, it is necessary to set the left-hand unit or carriage 46 for height of window opening. This is accomplished by loosening the thumb screw 117 and moving the unit 46 along the horizontal support 45 until the index point 121 (Fig. 7) registers with the correspondent figure on the scale 122. It is assumed that the index point 121 has been previously set relative to the frame 114 of the left-hand unit 46 to provide the desired clearance between the bottom bar and the bottom of the window sill. This clearance is usually a constant in any blind shop and is ordinarily varied only when greater clearance is desired such as when hold down brackets for the blind are to be used.

Ladder tape is then withdrawn from the roll 55, passed upwardly about the pulleys 119, 119 or 124, 124 as the case may be, and the first rung of the ladder tape entered within the slots 67, 69 of the fixture 50. The ends of the ladder tape branches are individually folded back upon themselves about the adjacent posts 71, 71 of the tape-loop-forming member and stapled or otherwise secured to form a terminal loop on each of the ladder tape branches. It is assumed that the first two cross tapes have been cut from the ladder tape branches at the same time that the ladder tape previously measured on the machine was cut. However, if the roll of ladder tape 55 is a new roll, it will be necessary to cut out these first two cross tapes with a pair of scissors to leave sufficient length of ladder tape branches projecting beyond the first cross tape to form the above-mentioned loops.

The ladder tape is held reasonably taut by hand but without stretching the tape and a cross rung of the tape is entered within the slots 108, 108 (see Fig. 8) of the fixture 52 which is initially retained at the left end of its travel by the latch 107. The latch 107 is then depressed to release the fixture 52, which is biased to the right by the spring 106 to maintain the ladder tape taut for cutting without excessively stretching the tape.

All cross tapes of the ladder tape falling between the gauging member 109 and 111 are then severed from the ladder tape by the operator, using a pair of scissors. Then, the ladder tape branches are cut opposite the gauging member 110. These gauging members, which are all adjustable along the axis of the fixture 52, have previously been adjusted so as to indicate how many cross tapes are to be cut out and where the ladder tape branches are to be severed in order to leave sufficient length of ladder tape branches extending beyond the first and last cross tapes for the particular fittings, with which the ladder tape is to be used. The roll of ladder tape 55 is normally wound so that the exposed or outside branch of the tape is the branch that is to be placed towards the window in which instance the tape is led off over the pulley 127 and to and beyond the fixture 52 as indicated in Fig. 2. In certain instances where the tape is wound reversely, it is preferable to turn the roll over and lead from the top of the roll 55 between the pulley 127 and the tape support 129.

Some operators may prefer to place the free end of the ladder tape downwardly on the fixture 51, passing the tape about the tape pulleys 119, 119 or 124, 124 as the case may be and then engaging the tape with the fixture 50 and cutting the tape without the aid of the gauging members associated with the fixture 52. This, in effect, inverts the ladder tape giving a better closure of the blind in one direction of tilting.

Fig. 2 shows the ladder tape engaged within the fixtures 50 and 52 and passed upwardly about the pulleys 119, 119. The tape is shown before the loops have been formed in the upper end of the ladder tape and before the tape has been severed or cross tapes cut therefrom adjacent the fixture 52. For blinds for window openings between twenty and thirty inches high, the left-hand unit or carriage 46 is set for a height ten inches more than the actual height and the ladder tape then looped about the pulleys 124, 124, which are mounted five inches to the right of pulleys 119, 119.

*Applying bottom bar fitting*

Figure 4:
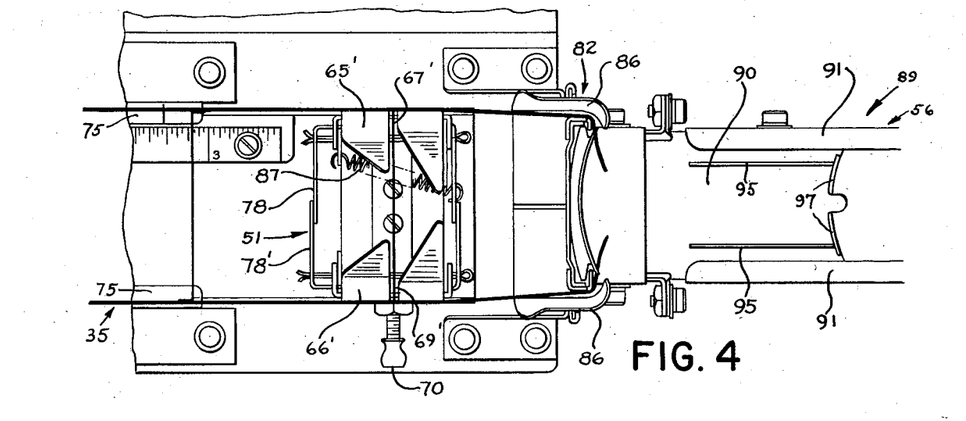
Fig. 4 (sheet 2) is an enlarged auxiliary view of the fixture and associated portion of the machine for receiving the bottom-bar-engaging end of the ladder tapes, taken perpendicular to the general plane of the portion of the frame upon which the fixture is mounted.
Figure 5:
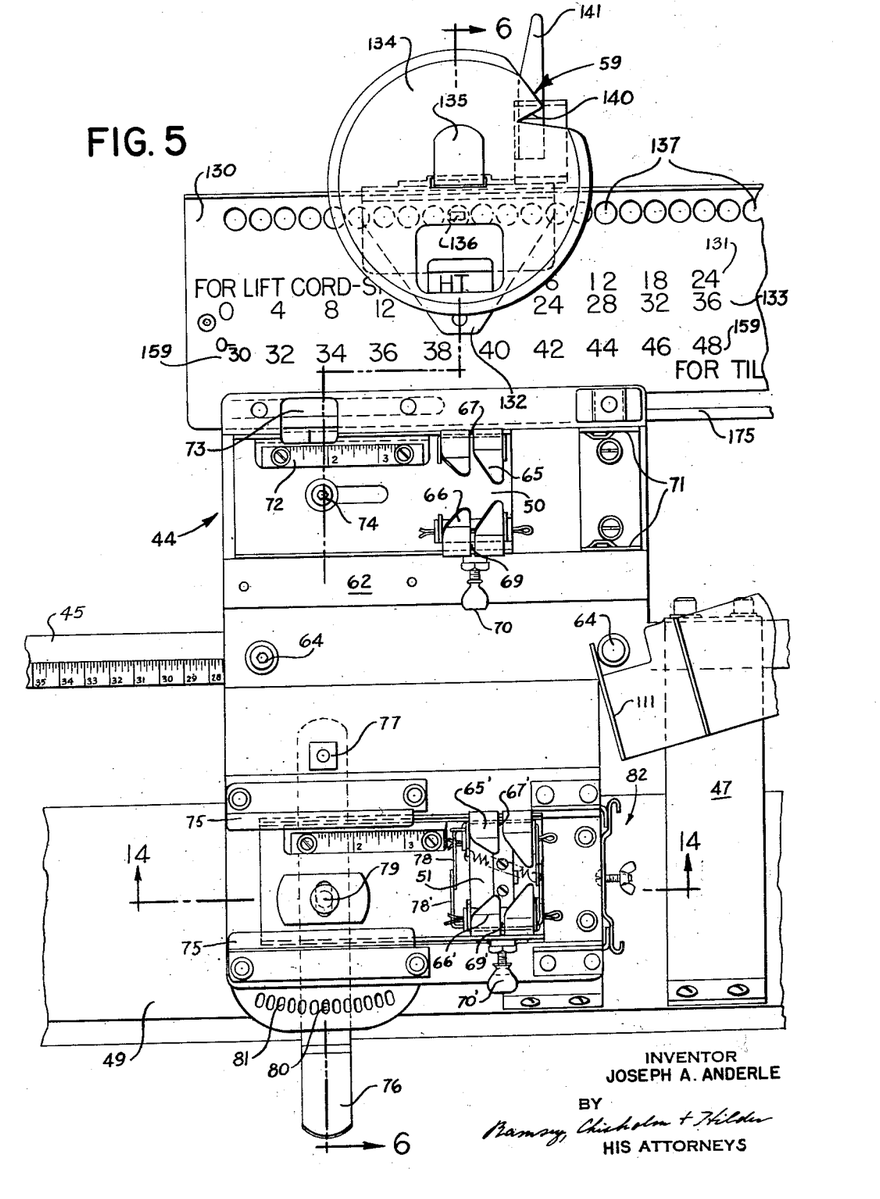
Fig. 5 (sheet 3) is an enlarged front auxiliary view of the right-hand portion of the machine, including the fixture for receiving the ends of the ladder tape and the fixture for receiving the cords, taken from the line 5—5 in Fig. 6.

With the lever 76 in its left position so as to move the fixture 51 to the left end of its travel, the end of the ladder tape previously formed by severing the tape at gauging member 110 is placed on the fixture 51 as indicated in Fig. 3 without stretching the tape, the tape still passing about the pulleys 119, 119. The last cross tape is of the ladder tape placed within the slots 67′ and 69′ (Figs. 4 and 16). When the cross tape is bottomed in the uncovered portion of those slots, the ladder tape branches will be at the proper elevation for the fixture 82 and bottom bar anchor body 84 if the cross tape is adjacent the upper edges of the tape branches. However, if the last cross tape is adjacent the lower edges of the ladder tape branches, the members 78 and 78′ must be moved to the right, so as to uncover the full depth of these slots, and be held there while bottoming the cross tape in the slots.

The lever 76 is then depressed to release it from the slots 81 and is moved to the right to move the fixture 51 to the right and tension the ladder tape between fixtures 50 and 51. The operator must attempt to tension the ladder tape as nearly as possible in accordance with the tension to which the tape will be subjected when in use due to the weight of the blind. In a blind of greater height or having heavier slats, the tapes will be tensioned to a greater degree than in a blind of lesser height or lighter slats.

After the lever 76 is forced to the right to tension the tape properly, it is permitted to rise to enter the tongue 80 within the adjacent slot 81 so as to hold the fixture 51 in adjust position with the ladder tape properly tensioned. The projecting ends of the ladder tape branches are then entered from the top between the channel-shaped member 83 of fixture 82 and the opposed inwardly curving members 86, 86 as indicated in Fig. 19. Also, a bottom bar anchor body 84 is inserted and positioned within the fixture 82 and the tape clamp 85 is positioned on the blades 95, 95, as also indicated in Fig. 19. The anchor body 84 will slip into the fixture 82 only when the side of the fitting with the deeper slots is away from the operator, the portion of the fixture 82 that is turned back on itself being slightly longer and received within the deeper slots of the fitting.

Figure 21:
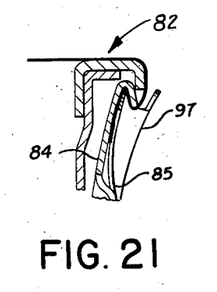
Fig. 21 (sheet 9) is an enlarged fragmentary view similar to Fig. 20, showing a portion of the fixture and fitting after attachment of the ladder tape to the fitting.

Then, by grasping the handle 103 and moving the lever 100 to the left, the blade ends 95, 95 are first engaged against the ladder tape ends to clamp the ladder tape ends against the inside surface of the fitting body 84, as indicated in Fig. 19. As the ram 92 continues to move to the left due to operation of the lever 100, the two opposite edges of the tape clamp 85 will engage the ladder tape branches as indicated in Fig. 20. As the ram continues to move to the left, the tape clamp 85 will be more or less flattened against the inside surface of the fitting body 84 so as to pull the tape tightly about the edge portions of member 83 of the fixture 82 and force the tape tightly within the fitting as indicated in Fig. 21. After clamping the tape within the fitting body 84, the lever 100 may be released to permit the ram to return to the right, after which the ladder tape may be removed from the fixtures 50 and 51 and is ready for assembly into a blind.

The succeeding ladder tapes for the blind are successively prepared in similar manner. However, for all succeeding ladder tapes for the same blind the setting of the lever 76 is not changed and the succeeding ladder tapes for the blind are stretched by hand sufficiently to be engaged with the fixture 51, thus assuring a uniform distance between the lowermost cross tape or rung of the ladder tape and the bottom bar anchor and assuring uniform length of tapes, with alignment in a horizontal plane of the corresponding rungs of all ladders of the blind so that the slats of the blind are level.

If excessive tension is required to fit the cross tape into the slots as set for a previous tape, of the same blind, it is a warning to the operator that the cross tape spacing of the ladder tape is either inaccurate or that a different tape size is being used (if a new roll of tape has been placed in the machine). This permits the operator to catch the mistake immediately and rectify it. Otherwise the mistake would likely not be discovered until most of the slats had been assembled into the blind, at which time it would be necessary to disassemble the blind and replace one or more of the ladder tapes.

*Measurement of lift cords*

In normal operation of the machine, the lift cord and tilt cord for each blind is measured and cut after the ladder tapes have been completed. For measuring the ladder tapes, the left-hand unit or carriage 46 is set for the length of window opening and, since this dimension affects both the lift cords and tilt cord, the setting of the carriage is not changed until after both the lift and tilt cords have been measured.

For measuring the lift cords of a direct lift blind, the plunger 149 of the left cord gauge 61 is depressed and the gauge is set along the scale 156 in accordance with the width of the window opening. The plunger 135 of the right cord gauge 59 is then depressed and the right cord gauge set along scale 131 for sill height, or height of the bottom bar from the floor. The cord is then withdrawn from a convenient reel (not shown) and the end of the cord engaged within the notch 140 (Fig. 5) and between the cord holder 141 and the plate 134. The cord is passed about the left-hand plunger 149 and back to the right-hand plunger 135 until there are four turns or eight runs of cord extending between the right cord gauge 59 and the left cord gauge 61, after which the cord is passed within the cord cutter 142 (Fig. 6) to cut the cord. The cord thus measured will be found to be of the proper length for a blind to fit the window opening dimension and sill height for which the machine is set.

Most Venetian blind manufacturers maintain a uniform height of the ends of the lift cord and tilt cord above the floor, this distance being uniform except in unusual circumstances. This distance may be altered by shifting the plate 130 (Fig. 1) to the right or left on the frame 62 of the right-hand unit 44, the plate 130 being provided with elongated slots 175, 175 near its bottom edge to permit this adjustment. A scale 176, registering with the right end of the plate 130, indicates settings of the plate 130 for various heights of the tilt cord and the depending looped end of the lift cords above the floor. The plate 130 may be moved to the right or left a slight distance according to whether knots or beads are to be used to secure the lift cords to the bottom bar, an overhand knot in the end of each lift cord requiring about 1½ inches of additional cord. Changes in the rout distance (distance of the lift cords from the ends of the slats) of the blind do not affect the length of the lift cords, since one branch of the cord is shortened by the precise amount that the other branch is lengthened, and there is no over-all change.

For the so-called compound-lift-cord blind indicated in Fig. 30, in which the ends of the lift cords are attached to the head bar, reeved downwardly through the slats, along the bottom bar, upwardly through the slats, and then along the head bar, the scale 133 on plate 130 is used, the right cord gauge 59 being set for sill height while the left cord gauge 61 is set along the scale 156 for width of window opening. The cord is then passed around the plungers 135 and 149 for six turns or twelve runs between the cord gauges and the cord severed as above described, which will produce a cord of the proper length for the lift cord of a compound lift blind for the window opening dimensions and sill height for which the machine is set.

*Measurement of tilt cord*

In measuring the tilt cord, the height of window opening and sill height affect the length required, but the width of window opening has no effect whatsoever. Accordingly, the left-hand unit or carriage 46 is left at the proper setting for height of window opening. For sill heights up to 30 inches, the right hand cord gauge 59 is set at the point on scale 159 that is marked "0–30" (inches) and the left cord 61 is set for proper sill height on scale 157. For sill heights above 30 inches, the left cord gauge 61 is set at the point on the scale 157 that is marked "30–74" (inches) and the right cord gauge 59 is set along the scale 159 in accordance with the sill height. The end of the length of cord is then engaged with the right cord gauge 59, passed about the transversely extending end portion 155 of the tilt cord hook 154, back about the plunger 135, a second turn about the portion 155 of the tilt cord hook and back to the right cord gauge 59, where the cord is severed by the cutter 142 (Fig. 6).

The scale 176 for height of lift cord ends above the floor is calibrated for the lift cord rather than the tilt cord and therefore, in setting the machine for different heights of the tilt cord ends above the floor, it is necessary to adjust the tilt cord hook 154 to the right or left on the left cord gauge 61 as required.

In gauging both lift cords and tilt cords for blinds for window openings between twenty and thirty inches high, the left-hand unit or carriage 46 is set for a window height ten inches greater, as explained in connection with gauging of the ladder tape. This results in lift cords and tilt cords which are somewhat longer than usual, but such blinds are usually used with abnormally high windows, and the extra length of the cords ordinarily is not objectionable. Further, the extra length of the tilt cord is often required in order to obtain enough length of cord between the tasselled ends to tilt the slats of the blind to completely closed position in both directions.

The machine of the present invention has been described in connection with the preparation of ladder tapes for use with a specific tape fitting and for the measuring of ladder tapes and lift cords and tilt cords for settings corresponding to height and width of window opening and sill height. The machine can be used for properly measuring tape and cords in accordance with the dimensions of a blind other than the window opening and for measuring the tilt and lift cords so that the depending ends will be a fixed height above the bottom bar of the blind rather than a fixed height above the floor.

As previously mentioned, the machine of the present invention may be used in the preparation of ladder tapes for blinds incorporating bottom bar anchors of types other than those just described. If a different type anchor is used the bottom bar anchor fixture 82 and anchor-attaching assembly 89 (Figs. 11 and 13) are removed and a suitable fixture adapted for use with the particular type anchor substituted. For example, the machine may be used with anchors of the types shown in Figs. 25 and 27. In preparing ladder tapes for a bottom bar anchor 161 of Fig. 25, which is generally similar to that shown in Lorentzen Patent 2,600,062 of June 10, 1952, the bottom bar anchor fixture 82 and the press-like anchor-attaching assembly 89 are removed from the machine and the fixture 162 of Fig. 24 substituted in place of the fixture 82. The fixture 162 comprises an angle-shaped support 164, one leg of which is bolted to the machine, and the other leg of which supports a U-shaped member 165 having mounted thereon a pair of upwardly extending U-shaped brackets and upwardly extending tape-loop-forming members taking the form of posts 166, 166 similar to the posts 71, 71 previously described. After tensioning the tape by moving the fixture 51 to the right as above described, the ends of the ladder tape branches are folded back upon themselves about the posts 166, 166 and the thus-formed loops secured as above described for the head bar end of the ladder tape.

Figures 24, 25, 26, 27, 28:
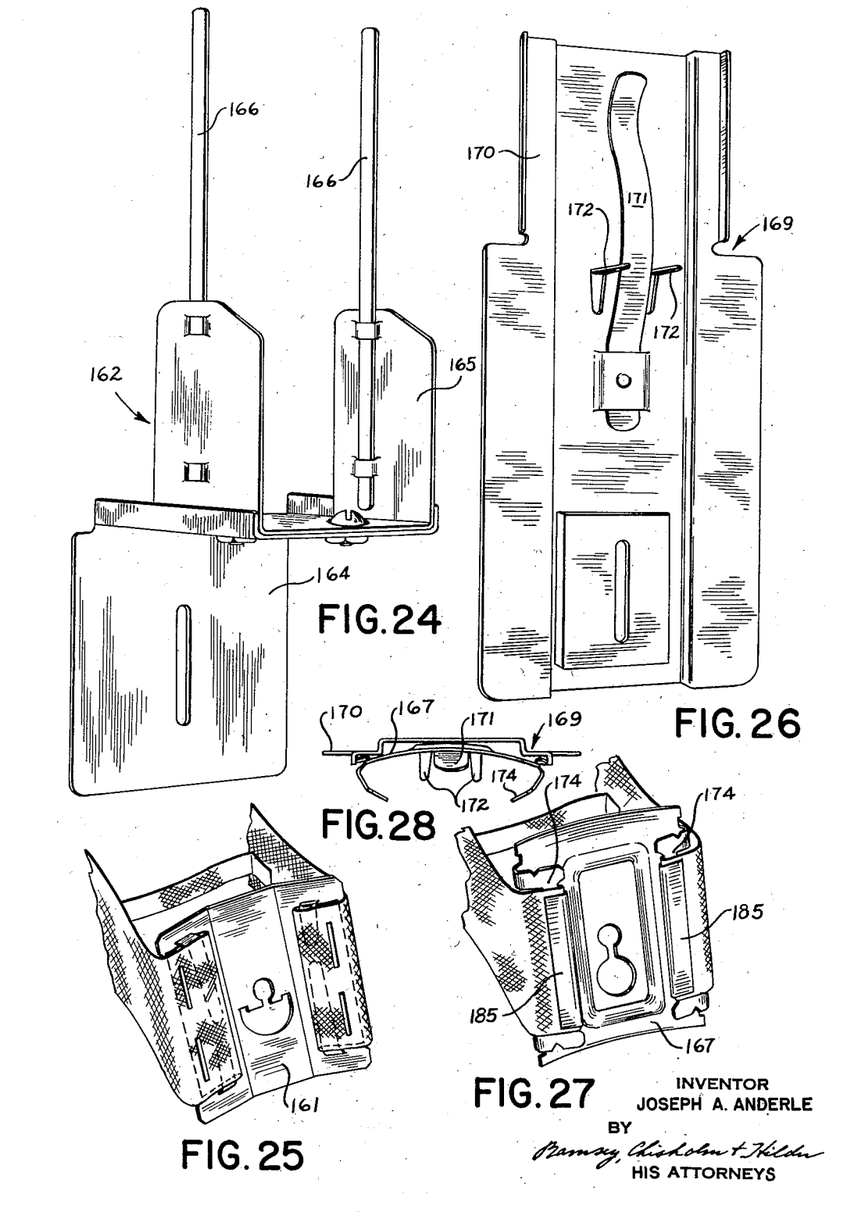
Fig. 24 (sheet 10) is a perspective view of a first alternative form of fixture for forming loops in the lower end of the ladder tape branch for receiving a different bottom bar anchor.
Fig. 25 (sheet 10) is a perspective view of an anchor of the type for which the fixture of Fig. 24 is used, showing an end of a Venetian blind ladder tape attached to the anchor.
Fig. 26 (sheet 10) is a perspective view of a second alternative form of fixture for receiving a second alternative bottom bar anchor.
Fig. 27 (sheet 10) is a perspective view of a bottom bar anchor with which the fixture of Fig. 26 is used, showing an end of Venetian blind ladder tape attached thereto.
Fig. 28 (sheet 10) is a top auxiliary view showing the fitting of Fig. 27 positioned within the fitting of Fig. 26.

The machine of the present invention may be used in preparing ladder tape for bottom-bar-incorporating fittings similar to the fitting 167 shown in Fig. 27 of the drawings and shown and described more completely in Lorentzen Patent 2,659,430. The fixture for holding the fitting 167 is in the form of a channel 170 having a resilient spring 171 for holding the fitting against the channel. A pair of stops 172, 172 limit downward movement of the anchor within the fixture. When the fixture 169 is used fixture 82 is removed, and anchor-attaching assembly 169 is bolted in the machine in the position vacated by the fixture 82.

The ladder tape is prepared as above described except that the operator manually folds each ladder tape branch about the bridge portion 174 of each fitting 167 and then applies a metal clip 185 to hold the ladder tape branches to the bridge portions of the fitting, after which the ladder tape and fitting is removed from the machine and is ready for assembly into a blind.

I claim:

1. A device useful for measuring a Venetian blind ladder tape and preparing it for a blind, said device comprising: a first tape fixture for holding an end portion of a Venetian blind ladder tape and having a portion interfitting with a rung of the tape, leaving the ends of the branches of the tape projecting from the fixture, a second tape fixture for holding the ladder tape at a point spaced from the first-mentioned fixture, leaving the ends of the branches of the tape projecting from the fixture, a member for receiving a bight of the ladder tape between the portions of the tape engaged with the two tape fixtures, said member being movable towards and away from said tape fixtures to vary the length of the path of tape between the two tape fixtures, and means adjacent each of said tape fixtures for receiving the projecting ends of the ladder tape branches and facilitating the forming of portions thereon for engaging the parts of a Venetian blind to which the ends of the ladder tape are to be attached, the second tape fixture being movable towards and away from the adjacent tape-branch-end-receiving means a distance substantially equal to the spacing between rungs of the ladder tape.

2. A device useful for measuring ladder tapes, lift cords, and tilt cords for a Venetian blind, said device comprising: a first tape fixture for holding an end portion of a Venetian blind ladder tape and having a portion interfitting with a rung of the tape, a second tape fixture for holding a Venetian blind ladder tape at a point spaced from the first-mentioned tape fixture, both of said fixtures having a common support; a carriage having a member mounted thereon for receiving a bight of ladder tape between the portions of the tape engaged by said fixtures, said carriage being relatively movable towards and away from said tape fixtures to vary the length of path of a ladder tape passed about said member and engaged with the fixtures; and a pair of cord-measuring members between which cord is adapted to be passed for measuring, one member being supported by the carriage and the other member being supported by the common support of the fixtures, whereby the measured length of cord is increased as the carriage is moved away from the fixtures to measure a ladder tape of greater length.

3. A device useful for measuring a Venetian blind ladder tape and preparing it for a blind, said device comprising: a first tape fixture for holding an end of a Venetian blind ladder tape and having a portion interfitting with a rung of the tape, a second tape fixture mounted adjacent the first tape fixture for holding the ladder tape at a point spaced from the first-mentioned fixture, leaving the ends of the ladder tape branches projecting from the fixture, means to vary the length of the path of the ladder tape between the two tape fixtures, and a bottom bar anchor support adjacent the second mentioned tape fixture, said second tape fixture being movable towards and away from the anchor support for a distance approximately equal to the spacing between adjacent rungs of the ladder tape.

4. A device useful for measuring a Venetian blind ladder tape and preparing it for a blind, said device comprising: a first tape fixture for holding an end portion of a Venetian blind ladder tape and having a portion interfitting with a rung of the tape, leaving the ends of the branches of the tape projecting from the fixture, a second tape fixture for holding the ladder tape at a point spaced from the first-mentioned fixture and having a portion interfitting with a rung of the tape, leaving the ends of the branches of the tape projecting from the fixture, means to vary the length of the path of the ladder tape between the two tape fixtures, and loop-forming fixtures adjacent the tape fixtures for receiving the ends of the ladder tape branches and facilitating the forming of terminal portions thereon for engaging the parts of a Venetian blind to which the ends of the ladder tape are to be attached, the second tape fixture being movable towards and away from the adjacent loop-forming fixture a distance substantially equal to the spacing between rungs of the ladder tape.

5. A device useful for measuring ladder tapes, lift cords, and tilt cords for Venetian blinds, said device comprising: a first tape fixture for holding an end portion of a Venetian blind ladder tape and having a portion thereof interfitting with a rung of the tape, leaving the ends of the branches of the tape projecting from the fixture, means for receiving the ends of the ladder tape branches projecting from said first tape fixture and facilitating the forming of means thereon for engaging the tilting mechanism of a Venetian blind; a second tape fixture for holding the Venetian blind ladder tape at a point spaced from the first fixture and having a portion thereof interfitting with a rung of the tape, leaving the ends of the ladder tape branches projecting from the fixture, means for receiving the ends of the ladder tape branches projecting from said second tape fixture and facilitating the attachment of a bottom bar anchor thereto, a common support for both of said tape fixtures, a carriage having a member mounted thereon for receiving a bight of ladder tape between the portions of the tape engaged by said fixtures, said carriage being relatively movable towards and away from said common support to vary the length of path of ladder tape passed about said tape member and engaged with said fixtures; and a pair of cord-measuring members about which the cord is adapted to be passed for measuring a tilt cord and a lift cord, one member being supported by the carriage and the other member being supported by the common support of the fixtures, whereby the measured length of cord is increased as the carriage is moved away from said common support to measure a ladder tape of greater length, both of said cord-measuring members being adjustable towards and away from each other to vary the measured length of cord in accordance with the width of blind and in accordance with height of the lower end of the blind above the floor.

6. A device useful for measuring ladder tapes, lift cords, and tilt cords for a Venetian blind, said device comprising: a first tape fixture for holding an end portion of a Venetian blind tape, a second tape fixture for holding a Venetian blind ladder tape at a point spaced from the first tape fixture, means for supporting both of said tape fixtures against movement relative to each other, a carriage having a member mounted thereon for receiving a bight of ladder tape between the portions of the tape engaged by said fixtures, said carriage being relatively movable towards and away from said tape fixtures to vary the length of path of a ladder tape passing about said member and engaged with the fixtures; and a pair of cord-measuring members between which cord is adapted to be passed for measuring in a path generally parallel to the runs of the ladder tape between the tape fixtures and the bight in said ladder tape, one member being supported by the carriage, whereby the measured length of cord is increased as the carriage is moved away from the fixtures to measure a ladder tape of greater length.

7. A device useful for measuring ladder tapes, lift cords, and tilt cords for a Venetian blind, said device comprising: a first tape fixture for holding an end portion of a Venetian blind tape, a second tape fixture for holding a Venetian blind ladder tape at a point spaced from and lying generally beneath the first tape fixture, means for supporting both of said tape fixtures against movement relative to each other, a carriage having a member mounted thereon for receiving a bight of ladder tape between the portions of the tape engaged by said fixtures and to support the tape in two generally parallel horizontal runs, said carriage being relatively movable horizontally towards and away from said tape fixtures to vary the length of path of a ladder tape passing about said member and engaged with the fixtures; and a pair of cord-measuring members between which cord is adapted to be passed for measuring in a path generally parallel to the runs of the ladder tape between the tape fixtures and the bight in said ladder tape, one member being supported by the carriage, whereby the measured length of cord is increased as the carriage is moved away from the fixtures to measure a ladder tape of greater length.

8. A device useful for measuring ladder tapes, lift cords, and tilt cords for a Venetian blind, said device comprising: a first tape fixture for holding an end portion of a Venetian blind ladder tape, a second tape fixture for holding a Venetian blind ladder tape at a point spaced from the first tape fixture, means for engaging the tape along its run between said fixtures, a carriage mounting said engaging means and relatively movable towards and away from the first tape fixture for changing the effective length of the path of the tape between the two tape fixtures, and a pair of cord-measuring members between which cord is adapted to be passed for measuring in a path generally parallel to the main extent of the ladder tape between the tape fixtures, one member being supported by the carriage, whereby the measured length of cord is increased as the carriage is moved away from the first tape fixture to measure a ladder tape of greater length.

9. A device useful for measuring ladder tapes, lift cords, and tilt cords for a Venetian blind, said device comprising: a first tape fixture for holding an end portion of a Venetian blind ladder tape, a support for the first tape fixture, a second tape fixture for holding a Venetian blind ladder tape at a point spaced from the first tape fixture, means for engaging the tape along its run between said fixtures, a carriage mounting said engaging means and relatively movable towards and away from the first tape fixture for changing the effective length of the path of the tape between the two tape fixtures, a pair of lift cord-measuring members between which lift cord is adapted to be passed for measuring in a path generally parallel to the main extent of the ladder tape between the tape fixtures, the first such member being supported by the carriage and the second such member being supported by the support for the first tape fixture, and a third, tilt cord-measuring member supported by the carriage for the reception of one end of runs of tilt cord extending between it and the first cord-measuring member, whereby the measured lengths of both the lift cord and the tilt cord are increased as the carriage is moved away from the first tape fixture to measure a ladder tape of greater length.

10. A device useful for measuring ladder tapes, lift cords, and tilt cords for a Venetian blind, said device comprising: a first, fixed, tape fixture at a first measuring station for holding an end portion of a Venetian blind ladder tape, a second tape fixture for holding a Venetian blind ladder tape at a point spaced from the first tape fixture, means forming a second movable, measuring station including means for engaging the tape along its run between said fixtures and a carriage mounting said engaging means and relatively movable towards and away from the first tape fixture for changing the effective length of the path of the tape between the two tape fixtures, and a pair of cord-measuring members between which cord is adapted to be passed for measuring in a path generally parallel to the main extent of the ladder tape between the tape fixtures, one member being supported at the second station by the carriage and the other member being supported at the first station, whereby the measured length of cord is increased as the carriage is moved away from the first tape fixture to measure a ladder tape of greater length.

References Cited in the file of this patent

UNITED STATES PATENTS

| | | |
|---|---|---|
| 1,625,725 | Irvin | Apr. 19, 1927 |
| 2,035,006 | Weinerth | Mar. 24, 1936 |
| 2,242,050 | Bauwens | May 13, 1941 |
| 2,388,875 | Skinner | Nov. 13, 1945 |
| 2,418,515 | Lewis | Apr. 8, 1947 |
| 2,478,003 | Nelson | Aug. 21, 1949 |
| 2,635,333 | Vodra | Apr. 21, 1953 |
| 2,703,447 | Rosenbaum | Mar. 8, 1955 |